(No Model.)
F. F. STEVENS.
NUT LOCK.
No. 463,650. Patented Nov. 24, 1891.
Fig: 1.
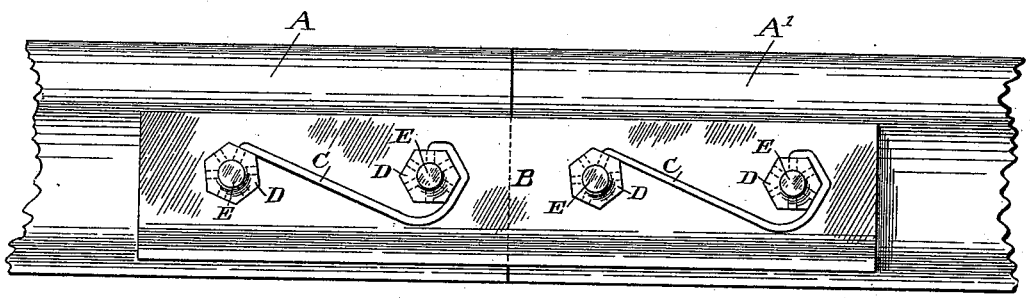
Fig: 2.
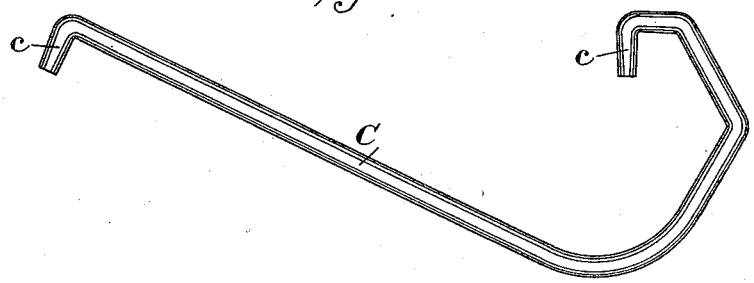
Fig: 3.
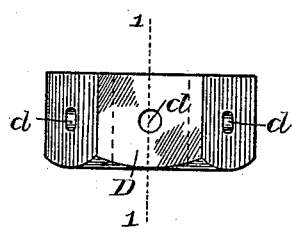
Fig: 4. Section, 1-1.
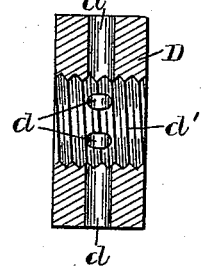
WITNESSES:
John W. Fisher
Fred. J. Lawrence
INVENTOR,
Fenton F. Stevens
BY
Robert W. Hardie
ATTORNEY.

UNITED STATES PATENT OFFICE.

FENTON F. STEVENS, OF JANESVILLE, WISCONSIN.

NUT-LOCK.

SPECIFICATION forming part of Letters Patent No. 463,650, dated November 24, 1891.

Application filed April 27, 1891. Serial No. 390,697. (No model.)

*To all whom it may concern:*

Be it known that I, FENTON F. STEVENS, a citizen of the United States, residing at Janesville, in the county of Rock and State of Wisconsin, have invented certain new and useful Improvements in Nut-Locks; and I do hereby declare the following to be a full, clear, and exact description of the invention, such as will enable others skilled in the art to which it appertains to make and use the same.

My invention has for its objects to provide means for securely fastening a nut upon its engaging bolt and also for readily removing the nut when desired.

This invention is especially adapted to be applied to nuts used on railway-tracks in connection with fish-plates, for the reason that the locking device cannot be affected by any vibrations communicated to it by a passing train.

The objects of my invention I accomplish by the means illustrated in the accompanying drawings, in which—

Figure 1 is a side view of a nut-lock embodying my invention applied to a fish-plate and the meeting ends of two rails. Fig. 2 is a plan view of a locking-spring. Fig. 3 is a side view of a nut provided with apertures on its sides. Fig. 4 is a vertical cross-section of the same, taken on line 1 1 of Fig. 3.

As illustrated in the drawings, A and A' represent the meeting ends of two rails. These ends are clamped together by means of fish-plates B, which are secured in place by bolts E and engaging nuts D. The sides of the nuts D are provided with apertures $d$, for the purpose hereinafter described. I prefer to extend these apertures from the outside of the nuts to the thread $d'$, as illustrated in Fig. 4.

C represents a locking-spring, having offset ends $c$ arranged in substantially the same horizontal plane and adapted to engage with the apertures $d$, formed in the sides of the nuts D. One end of this spring is curved downward and then upward, so as to pass around the side of one of the nuts D.

I prefer to make the upper portion of the curved end of the spring straight in parts to correspond with the sides and angles of the nuts D. By means of such construction this end of the spring secures a firm hold on the sides of the nut.

When in use the parts are in the position illustrated in Fig. 1, the offset ends $c$ of the spring engaging with the apertures formed in the sides of the nuts. When the parts are arranged as described, the nuts are firmly secured in place by the spring C, and are not affected by any jar or vibration which may be communicated to the bolts or nuts. The spring C is self-tightening in operation, and therefore when a nut begins to turn on its bolt the tension of the spring increases, and the spring grasps and holds the nut more firmly. In consequence of the peculiar construction of the spring C its tension is exerted in both a vertical and a longitudinal direction. The vertical tension holds the offset ends of the spring in the apertures of the nuts, and the longitudinal tension resists the tendency of the nuts to turn on their bolts. When it is desired to adjust or remove the nuts or bolts, the straight end of the spring is lifted up out of engagement with the aperture $d$, and the curved end of the spring is then removed from the adjacent nut. The bolt and nuts are then free to be removed or adjusted, as desired. It is evident that neither the bolts nor nuts are in any way injured by the use of my locking device.

What I claim is—

The combination, with two adjacent bolts, of engaging nuts having straight sides provided with apertures, and a resilient locking-bar having offset ends held in engagement with the uppermost apertures of the nuts by spring-tension, a straight main portion extending at an incline between the nuts, the lower end of which terminates in an upturned portion bent to conform to and bear directly against the sides of one of the nuts, substantially as shown and described.

In testimony whereof I affix my signature in presence of two witnesses.

FENTON F. STEVENS.

Witnesses:
L. P. DEARBORN,
H. H. McKINNEY.